United States Patent
Yamazaki

(10) Patent No.: US 10,596,677 B2
(45) Date of Patent: Mar. 24, 2020

(54) MACHINE TOOL CONTROL SYSTEM CAPABLE OF OBTAINING WORKPIECE ORIGIN AND WORKPIECE ORIGIN SETTING METHOD

(71) Applicant: FANUC CORPORATION, Yamanashi (JP)

(72) Inventor: Takashi Yamazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 732 days.

(21) Appl. No.: 15/195,953

(22) Filed: Jun. 28, 2016

(65) Prior Publication Data

US 2017/0017226 A1 Jan. 19, 2017

(30) Foreign Application Priority Data

Jul. 14, 2015 (JP) ................. 2015-140826

(51) Int. Cl.
*B23Q 17/24* (2006.01)
*B23Q 17/22* (2006.01)

(52) U.S. Cl.
CPC ..... *B23Q 17/2471* (2013.01); *B23Q 17/2233* (2013.01); *B23Q 17/2241* (2013.01); *B23Q 17/2428* (2013.01)

(58) Field of Classification Search
None
See application file for complete search history.

(56) References Cited

U.S. PATENT DOCUMENTS

| | | | |
|---|---|---|---|
| 2011/0046773 A1* | 2/2011 | Iwashita | G05B 19/4097 700/182 |
| 2014/0148939 A1* | 5/2014 | Nakano | G01B 11/2545 700/166 |

FOREIGN PATENT DOCUMENTS

| | | |
|---|---|---|
| CN | 102416581 A | 4/2012 |
| CN | 103962889 A | 8/2014 |
| DE | 102007016056 A1 | 10/2008 |
| EP | 2216697 A1 | 8/2010 |
| JP | 60-118452 A | 6/1985 |
| JP | 62-085343 U | 5/1987 |
| JP | 63-28541 A | 2/1988 |
| JP | 2-256480 A | 10/1990 |
| JP | 3-213244 A | 9/1991 |

(Continued)

*Primary Examiner* — Mohammad Ali
*Assistant Examiner* — Saad M Kabir
(74) *Attorney, Agent, or Firm* — Hauptman Ham, LLP

(57) ABSTRACT

A machine tool control system according to the present invention includes: a three-dimensional coordinate computing unit which calculates three-dimensional coordinates of a workpiece based on a plurality of images of the workpiece, the images being taken by the imaging apparatus from a plurality of different directions, and which calculates, from the three-dimensional coordinates, three-dimensional coordinates of a specified machining start point on the workpiece; and a coordinate converting unit which converts three-dimensional coordinates that includes the machining start point on the workpiece calculated by the three-dimensional coordinate computing unit into coordinates in the machine coordinate system for the machine tool, and which sets the converted three-dimensional coordinates of the machining start point on the workpiece, as a workpiece origin, into the machining program for the machine tool.

7 Claims, 4 Drawing Sheets

(56) References Cited

FOREIGN PATENT DOCUMENTS

| | | |
|---|---|---|
| JP | 08-000350 B2 | 1/1996 |
| JP | 2003-205440 A | 7/2003 |
| JP | 2008-62351 A | 3/2008 |

* cited by examiner

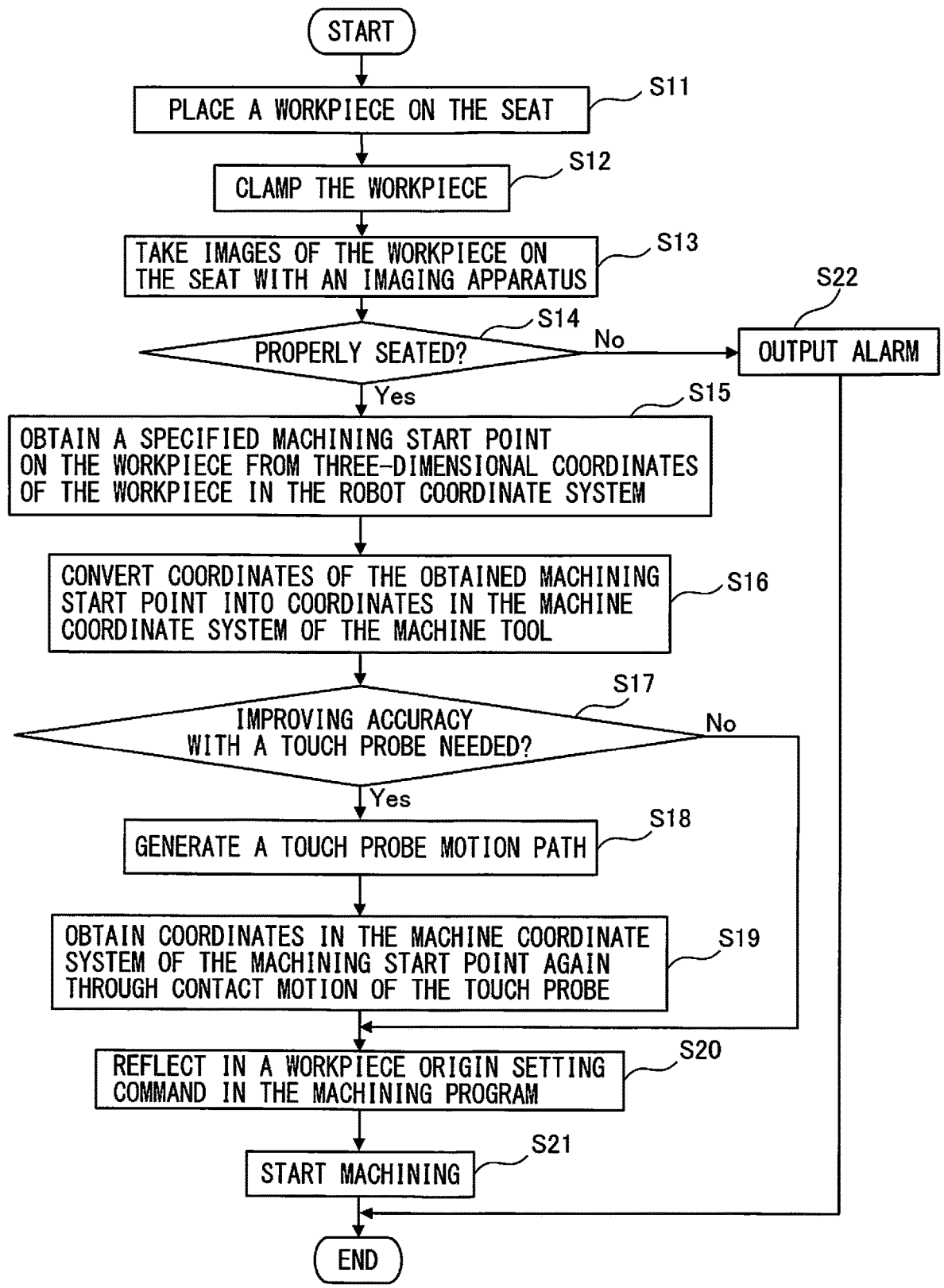

MACHINE TOOL CONTROL SYSTEM CAPABLE OF OBTAINING WORKPIECE ORIGIN AND WORKPIECE ORIGIN SETTING METHOD

RELATED APPLICATIONS

The present application claims priority to Japanese Patent Application Number 2015-140826 filed Jul. 14, 2015, the disclosure of which is hereby incorporated by reference herein in its entirety.

BACKGROUND OF THE INVENTION

1. Field of the Invention

The present invention relates to a machine tool control system controlling an NC machine tool in accordance with a machining program, and to a workpiece origin setting method for setting a workpiece origin when the workpiece is going to be machined in the NC machine tool.

2. Description of the Related Art

For operating NC machine tools such as an NC milling machine or machining center, it is necessary to place a workpiece on the machining table of the machine tool, and, before staring machining, obtain a predetermined position on the placed workpiece as the workpiece origin to create a machining program using the workpiece origin as a reference point. As the workpiece origin, it is necessary to use coordinates of a predetermined position on the workpiece in the machine coordinate system for the machine tool.

In general, such coordinates of a workpiece origin are obtained by employing a method that uses a touch probe and a tool setter. The method will now be described more specifically.

For example, when the workpiece origin for machining a substantially cuboid-shaped workpiece in a vertical machining center is the center of the top face of the workpiece, the machine operator starts with placing the workpiece on the machining table of the vertical machining center, and attaches a touch probe, instead of a machining tool, to the main spindle. Then, the machine operator uses a manual pulse generator to move the machining table in the x-axis direction and in the y-axis direction from the machine origin so that the stylus of the touch probe comes into contact with each end face of the workpiece. The machine operator then determines positional coordinates of each end face of the workpiece in the machine coordinate system, based on the amounts of movement of the machining table in the X-axis and Y-axis directions when the touch probe contacts the workpiece. In addition, the machine operator calculates positional coordinates corresponding to the center of the top face of the workpiece, based on the positional coordinates of each end face in the machine coordinate system. Then, the machine operator sets the calculated positional coordinates into the machining program, as the workpiece origin in the X-axis and Y-axis directions. The terms "X-axis direction" and "Y-axis direction" as used herein mean the horizontal direction and the front-to-back direction, respectively, of a vertical machining center.

The machine operator proceeds to set the workpiece origin in the Z-axis direction, i.e., the vertical direction, of the vertical machining center. For this purpose, the machine operator places a tool setter on the top face of the workpiece on the machining table, attaches to the main spindle the machining tool to be used for machining the workpiece, and sets the type of the machining tool into the machining program. Then, the machine operator uses a manual pulse generator to move the main spindle from the height of the origin in the −Z-axis direction (downward) so that the tip of the machining tool comes into contact with the tool setter. In addition, the machine operator calculates the positional coordinate of the top face of the workpiece in the machine coordinate system, by subtracting the height of the tool setter from the amount of movement of the main spindle in the −Z-axis direction when the tool setter is contacted. Then, the machine operator sets the calculated positional coordinate into the machining program as the workpiece origin in the Z-axis direction.

Workpiece origins have conventionally been determined by using a method as described above, whereas Japanese Examined Patent Application Publication No. 08-00350 proposes a method for improving positional accuracy of a workpiece origin. Japanese Examined Patent Application Publication No. 08-00350 describes the method provided below to be used for setting a workpiece origin by attaching a touch sensor to the main spindle to bring the sensor into contact with an end face of the workpiece. According to the patent application, a touch sensor is moved at a high speed from the start point to an end face of the workpiece. After the touch censor is turned on, it is moved backward at a very low speed to be turned off, at which moment the position is measured, and then the touch sensor is returned to the start point at a high speed; then, the touch sensor is rotated around the main spindle 180° and subjected to the same procedure again. The patent application states that such method provides the effect of avoiding measurement errors attributable to an eccentricity of the main spindle.

Japanese Utility Model Application Laid-open Publication No. 62-085343 discloses a method for setting a workpiece origin using a camera, without using any touch detectors such as the above-mentioned touch sensor, tool setter, or any touch sensor. Specifically, Japanese Utility Model Application Laid-open Publication No. 62-085343 discloses that when an operator moves a cursor attached to the camera to align the cursor with the center of a workpiece while watching an image taken by the camera attached to the headstock of a machine tool, a computing apparatus calculates the center position of the workpiece from the position of the camera attached to the machining tool and from the position of the cursor on the camera.

However, the method disclosed in Japanese Examined Patent Application Publication No. 08-00350 is problematic in that a lot of time and labor are needed because the machine operator needs to attach a touch detector, such as a touch sensor, to the main spindle and bring the touch detector and the workpiece into contact with each other.

The method disclosed in Japanese Utility Model Application Laid-open Publication No. 62-085343 is also problematic in that it takes time to obtain a workpiece origin because the operator needs to control the cursor on the camera while watching an image taken by the camera.

SUMMARY OF INVENTION

The present invention provides a machine tool control system and a workpiece origin setting method that allow for setting a workpiece origin without manual intervention.

According to a first aspect of the present invention,
there is provided a machine tool control system including:
a machine tool which machines a workpiece according to a machining program;
an imaging apparatus which is placed at a predetermined position in the machine tool and takes an image of the workpiece;

a three-dimensional coordinate computing unit which calculates three-dimensional coordinates of the workpiece based on a plurality of images of the workpiece, the images being taken by the imaging apparatus from a plurality of different directions, and which calculates, from the three-dimensional coordinates, three-dimensional coordinates of a specified machining start point on the workpiece; and a coordinate converting unit which converts three-dimensional coordinates including the machining start point on the workpiece, that is calculated by the three-dimensional coordinate computing unit, into a position in a machine coordinate system for the machine tool, and the coordinate converting unit setting the converted three-dimensional coordinates of the machining start point on the workpiece, as a workpiece origin, into the machining program for the machine tool.

According to a second aspect of the present invention, there is provided the machine tool control system of the first aspect, further including:

a robot whose relative position to the machine tool is predetermined, wherein the imaging apparatus along with a hand which grips the workpiece are attached to a tip of the robot, and wherein the robot is configured to place the imaging apparatus at the predetermined position in the machine tool.

According to a third aspect of the present invention, there is provided the machine tool control system of the first aspect, wherein the machine tool includes a turret-type automatic tool changer to which a plurality of machining tools can be attached, wherein the imaging apparatus is attached to a turret on the turret-type automatic tool changer, and wherein the turret is configured to place the imaging apparatus at the predetermined position in the machine tool.

According to a fourth aspect of the present invention, there is provided the machine tool control system of the first or second aspect, further including:

a touch probe motion path generating unit which generates a motion path of a touch probe to be brought into contact with each end face and a top face of the workpiece, based on three-dimensional coordinates of the workpiece, the coordinates being obtained by the coordinate converting unit; and a machine tool control unit which controls the machine tool, and which causes the machine tool to perform contact motion of the touch probe according to the motion path of the touch probe, the motion path being generated by the touch probe motion path generating unit.

According to a fifth aspect of the present invention, there is provided the machine tool control system of the fourth aspect, further including:

a workpiece origin updating unit which obtains, in response to contact motion of the touch probe, positional coordinates of each end face and a top face of the workpiece in the machine coordinate system, calculates three-dimensional coordinates of a specified machining start point on the workpiece from the obtained positional coordinates, and re-sets the three-dimensional coordinates, as a workpiece origin, into the machining program for the machine tool.

According to a sixth aspect of the present invention, there is provided a workpiece origin setting method for setting a workpiece origin in a machine tool which machines a workpiece according to a machining program, the method including:

placing an imaging apparatus at a predetermined position in the machine tool and taking an image of the workpiece from a plurality of different directions;

calculating three-dimensional coordinates of the workpiece based on a plurality of taken images of the workpiece, and calculating, from the three-dimensional coordinates, three-dimensional coordinates of a specified machining start point on the workpiece;

converting three-dimensional coordinates that include the calculated machining start point on the workpiece into coordinates in a machine coordinate system for the machine tool; and setting the converted three-dimensional coordinates of the machining start point on the workpiece, as a workpiece origin, into the machining program for the machine tool.

According to a seventh aspect of the present invention, there is provided the workpiece origin setting method of the sixth aspect, including:

after setting the workpiece origin, generating a motion path of a touch probe to be brought into contact with each end face and a top face of the workpiece, based on three-dimensional coordinates of the workpiece in the machine coordinate system for the machine tool; and causing the machine tool to perform contact motion of the touch probe, according to the generated motion path of the touch probe.

According to an eighth aspect of the present invention, there is provided the workpiece origin setting method of the seventh aspect, including:

obtaining positional coordinates of each end face and a top face of the workpiece in the machine coordinate system, by causing the machine tool to perform contact motion of the touch probe; calculating, from the obtained positional coordinates, three-dimensional coordinates of a specified machining start point on the workpiece; and re-setting the three-dimensional coordinates, as a workpiece origin, into the machining program for the machine tool.

According to a ninth aspect of the present invention, there is provided the workpiece setting method of the sixth aspect, including:

rotating, at a predetermined rotation speed, a main spindle to which a machining tool for the machine tool is to be attached;

after setting a workpiece origin, moving the rotating main spindle to each end face and a top face of the workpiece, based on three-dimensional coordinates of the workpiece in the machine coordinate system for the machine tool; and obtaining positional coordinates of each end face and a top face of the workpiece in the machine coordinate system when there is an increase in disturbance torque on the rotating main spindle, the increase being caused by contact with the workpiece, calculating, from the obtained positional coordinates, three-dimensional coordinates of a specified machining start point on the workpiece, and re-setting the three-dimensional coordinates, as a workpiece origin, into the machining program for the machine tool.

The above objects, features, and advantages as well as other objects, features, and advantages of the present invention will be clear based on the detailed description of exemplary embodiments of the present invention as illustrated in the accompanying drawings.

BRIEF DESCRIPTION OF THE DRAWINGS

FIG. 3 is a flow chart illustrating an example operation flow for the machine tool control system depicted in FIG. 1 to obtain a workpiece origin.

DETAILED DESCRIPTION

Figure 1:
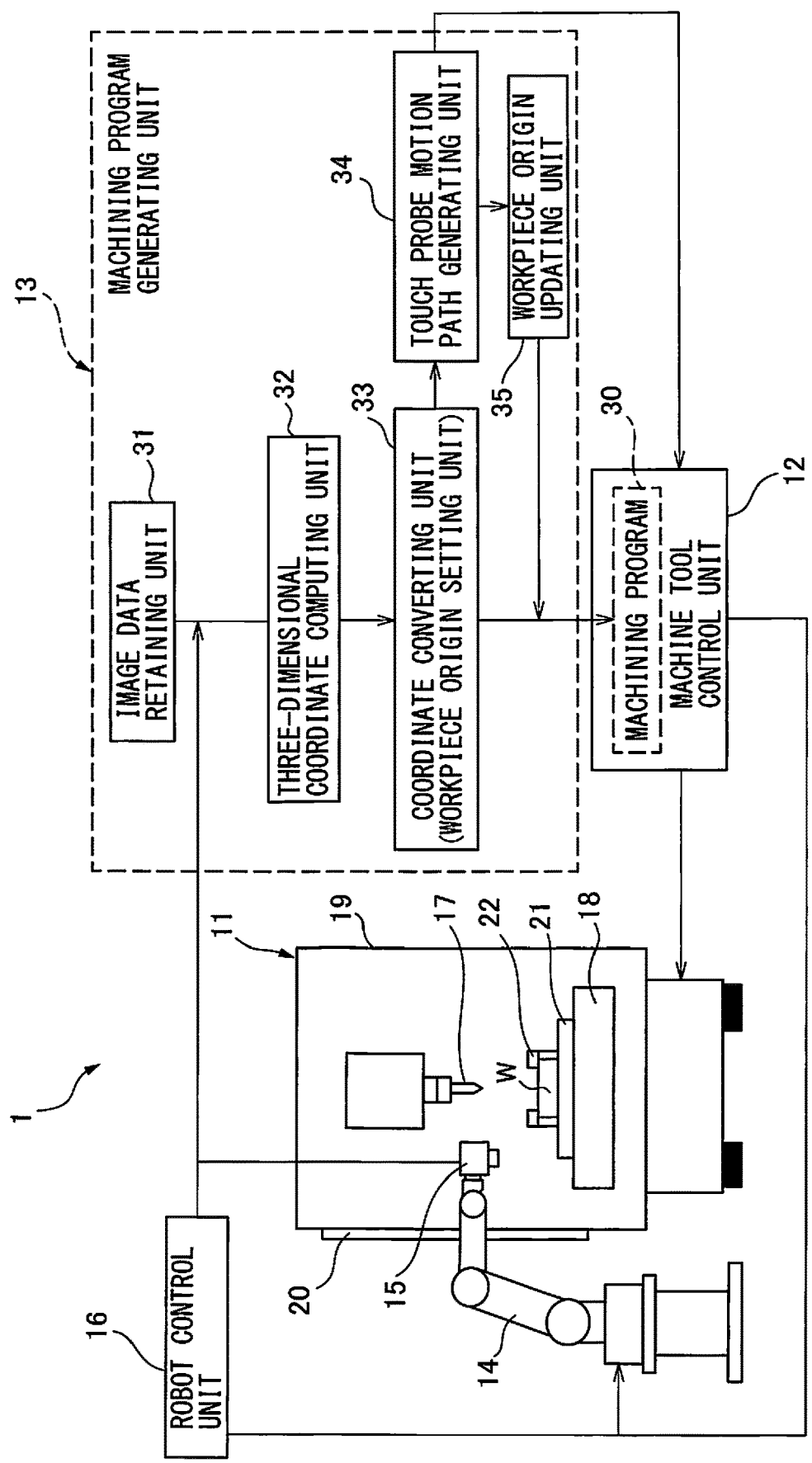
FIG. 1 is a block diagram illustrating a general configuration of a machine tool control system according to one embodiment.

Embodiments of the present invention will now be described with reference to the drawings. Like reference symbols indicate like members throughout the drawings below. For ease of understanding, the scale of each of these drawings may be changed as appropriate. It should be noted that embodiments illustrated in the drawings are example embodiments of the present invention, and the present invention is not limited to the embodiments illustrated herein.

FIG. 1 is a block diagram illustrating a general configuration of a machine tool control system according to one embodiment of the present invention.

With reference to FIG. 1, the machine tool control system 1 according to the present embodiment includes: a machine tool 11, e.g., an NC milling machine or a machining center; a machine tool control unit 12 which controls the machine tool 11; a machining program generating unit 13 which generates a machining program 30 and outputs it to the machine tool control unit 12; a robot 14 which is installed next to the machine tool 11; an imaging apparatus 15 which is attached to the tip of the robot 14 to take images of a workpiece W; and a robot control unit 16 which controls the robot 14. The machining program generating unit 13 includes functions to obtain a workpiece origin to be used for machining the workpiece W placed in the machine tool 11 and to set the workpiece origin into the machining program 30.

It is assumed that the relative positions of the robot 14 and the imaging apparatus 15 illustrated in FIG. 1 to each other are predetermined through calibration. Likewise, it is assumed that the relative positions of the robot 14 and the machine tool 11 to each other are predetermined. It is further assumed that the robot 14 and the machine tool 11 share the same coordinates or that it is possible to determine a unique position of either one in the other's coordinate system through mutual coordinate conversion.

The above-described components of the machine tool control system 1 will now be described in further detail in sequence.

The machine tool 11 includes inside its casing 19: a machining tool 17 which performs machining such as drilling or cutting; and a machining table 18 which moves the workpiece W. A door 20 is disposed on one side of the casing 19. The door 20 is closed during machining and is opened when the tip of the robot 14 is brought into the casing 19. Furthermore, as illustrated in FIG. 1, on the machining table 18 are disposed a seat 21 for mounting a workpiece W thereon and a fixture 22 for positioning and fixing the workpiece W mounted on the seat 21. The fixture 22 includes a clamp mechanism for clamping the workpiece W onto the seat 21. It should be noted that for clear understanding of components inside the casing 19, FIG. 1 depicts the machining tool 17, the machining table 18, and other components disposed inside the casing 19 in solid line, with the casing 19 illustrated as if it has transparent walls. The pre-machined workpiece W is a workpiece made of a metal, resin, or wood material, and the following description assumes that the workpiece W is a substantially cuboid-shaped ingot.

The robot 14 may be, for example, a vertical multi-articular robot. To the tip of the robot 14, a robot hand (not illustrated) capable of gripping the workpiece W, as well as the imaging apparatus 15 are attached. While the door 20 on the machine tool 11 is open, the robot 14 grips with its robot hand the workpiece W that has been prepared outside the casing 19, and places the workpiece W on the seat 21 in the casing 19, or grips with its robot hand the workpiece W that has been machined in the casing 19 to carry the workpiece W out of the casing 19. In addition, operations of the robot 14 according to the present invention include placing the imaging apparatus 15 attached to the tip of the robot at a predetermined position above the workpiece W mounted on the seat 21. It should be noted that, while FIG. 1 illustrates an aspect where the robot 14 is installed outside the casing 19, the robot 14 may be placed inside the casing 19. However, when the robot 14 is placed outside the casing 19, the imaging apparatus 15 attached to the tip of the robot 14 is allowed to operate in an environment with little influence of coolants or chips. Moreover, a lens in the imaging apparatus 15 can be cleaned while the machine tool 11 is machining the workpiece W, which provides the additional advantage that the machine tool 11 runs at a higher operating rate.

The imaging apparatus 15 has a function to take an image of the workpiece W on which the machining tool 17 will start machining. The imaging apparatus 15 is preferably a three-dimensional camera employing a twin-lens stereo system. In other words, the three-dimensional camera includes two cameras whose relative positions to each other are precisely determined, the two cameras taking images of the workpiece W from two different directions. Determining a height of a surface of the workpiece W based on corresponding points between the two pieces of image data taken by the cameras makes it possible to obtain three-dimensional coordinates of the workpiece W. Obviously, methods for obtaining three-dimensional coordinates of a surface of the workpiece according to the present invention are not limited the above-described twin-lens stereo system; a variety of other three-dimensional measuring techniques, such as the light section method, may be used. Furthermore, the twin-lens stereo system may be used in combination with the light section method to obtain three-dimensional coordinates of a surface of the workpiece. It is assumed that the camera position and other various parameters that will be needed when three-dimensional coordinates are obtained have been recorded in the robot control unit 16 in advance.

The imaging apparatus 15 may alternatively be a two-dimensional camera. In other words, images of the workpiece W can be taken from two different directions, by moving the robot 14's tip where a two-dimensional camera is attached to two predetermined positions in sequence above the seat 21. In the present embodiment, the imaging apparatus 15 takes two images of the workpiece W from two different directions; however, images of the workpiece W may be taken from three or more different directions to obtain three-dimensional coordinates of a surface of the workpiece from three or more pieces of image data, when needed.

Furthermore, in the present embodiment, it can be ascertained whether the workpiece W is properly seated on the seat 21 if image data of the workpiece W that is properly placed on the seat 21 has been obtained beforehand by using the imaging apparatus 15.

The machine tool control unit 12 includes a computer numerical control (CNC) apparatus to store and retain a machining program (also referred to as an NC program) 30 which describes information to be used for machining the workpiece W, such as machining paths, manufactured products, and machining tools. The machining program 30 is generated in the machining program generating unit 13. In addition, the machine tool control unit 12 includes a function to communicate with the robot control unit 16 so as to manipulate the robot 14 in conjunction with the machine tool 11 operating according to the machining program 30. Furthermore, the machine tool control unit 12 causes the door 20 on the casing 19 to open and close and notifies the robot control unit 16 that the door 20 has been opened.

The robot control unit 16 allows the robot 14 to be active while the door 20 on the casing 19 is open. In particular, when three-dimensional coordinates of the workpiece W are going to be obtained, the robot control unit 16 places the imaging apparatus 15 attached to the tip of the robot 14 at a predetermined position above the seat 21 to take images of the workpiece W. In addition, at about a time when the workpiece W is machined, the robot control unit 16 controls the robot 14 so that the robot hand (not illustrated) carries the workpiece W from outside the casing 19 into the casing 19 or from inside the casing 19 to the outside the casing 19.

The machining program generating unit 13 includes, as illustrated in FIG. 1, an image data retaining unit 31, a three-dimensional coordinate computing unit 32, a coordinate converting unit 33, a touch probe motion path generating unit 34, and a workpiece origin updating unit 35. Individual components of the machining program generating unit 13 will now be described in sequence.

The image data retaining unit 31 retains image data of the workpiece W taken by the imaging apparatus 15. Various recording media may be used as the image data retaining unit 31, such as RAM, a hard disk, USB memory, and so on.

The three-dimensional coordinate computing unit 32 calculates three-dimensional coordinates of the workpiece W, based on two pieces of image data obtained by taking images of the workpiece W from two different directions. The calculated three-dimensional coordinates of the workpiece surface are based on a predetermined position in the user coordinate system for the robot 14 to which the imaging apparatus 15 is attached. The user coordinate system for the robot 14 means a coordinate system that is defined based on an operation origin of the robot 14, where any operation origin can be specified by the user (the user coordinate system is hereinafter referred to as the robot coordinate system).

In addition, the three-dimensional coordinate computing unit 32 calculates three-dimensional coordinates of a specified machining start point on the workpiece W, from the three-dimensional coordinates of the workpiece W in the robot coordinate system. By way of example, it is assumed here that the three-dimensional coordinate computing unit 32 is already given the information to the effect that machining will be started from the center of the top face of the cuboid-shaped workpiece W. When the machining start point is the center of the top face of the cuboid-shaped workpiece W as described above, the three-dimensional coordinate computing unit 32 extracts, from the three-dimensional coordinates in the workpiece W, groups of coordinates constituting individual edges of a rectangular on the top face of the workpiece W, and then calculates coordinates of the center point of the rectangular based on the coordinates of a midpoint of each edge of the rectangular. Or, when the machining start point is one of the corners of the top face of the workpiece W, the three-dimensional coordinate computing unit 32 need only extract the coordinates corresponding to the one corner from three-dimensional coordinates of the workpiece W.

The coordinate converting unit 33 converts the calculated three-dimensional coordinates of a machining start point into coordinates in the machine coordinate system for the machine tool 11. In other words, the coordinates of a machining start point on the workpiece W, calculated as coordinates in the robot coordinate system, are converted into coordinates in the machine coordinate system. The coordinate converting unit 33 then sets the converted coordinates of the machining start point, namely the workpiece origin, into the machining program 30 in the machine tool control unit 12. For example, the NC program (machining program 30) stored and retained in a CNC apparatus contains descriptions of a command (for example, G54 in G-Code) for setting a workpiece coordinate system. The coordinate converting unit 33 writes the coordinates of such machining start point into G54 as the workpiece origin that will be read by the machining program 30 when the workpiece is machined. Thus, the coordinate converting unit 33 serves as a workpiece origin setting unit.

The touch probe motion path generating unit 34 generates a motion path of a touch probe (not illustrated) so that the touch probe comes in contact with each end face or a top face of the workpiece W. As described later in detail, the generated motion path is derived from three-dimensional coordinates of the workpiece W obtained through the three-dimensional coordinate computing unit 32 and the coordinate converting unit 33. When the machine tool 11 is a vertical machining center and the workpiece origin is obtained by using a touch probe, the machine operator attaches the touch probe (not illustrated), instead of the machining tool 17, to the main spindle of the machine tool 11. According to conventional arts, the machine operator has to move the main spindle and the machining table 18 of the machine tool 11 from the machine origin in the X-, Y-, and Z-axis directions as appropriate by using a manual pulse generator, so as to bring the stylus of the touch probe into contact with each end face or a top face of the workpiece W. In contrast, in the present embodiment, the touch probe motion path generating unit 34 automatically generates a motion path of such touch probe. Then, based on the generated motion path of the touch probe, the machine tool control unit 12 moves the main spindle and the machining table 18 of the machine tool 11 to cause the contact motion of the touch probe.

Figure 2A:
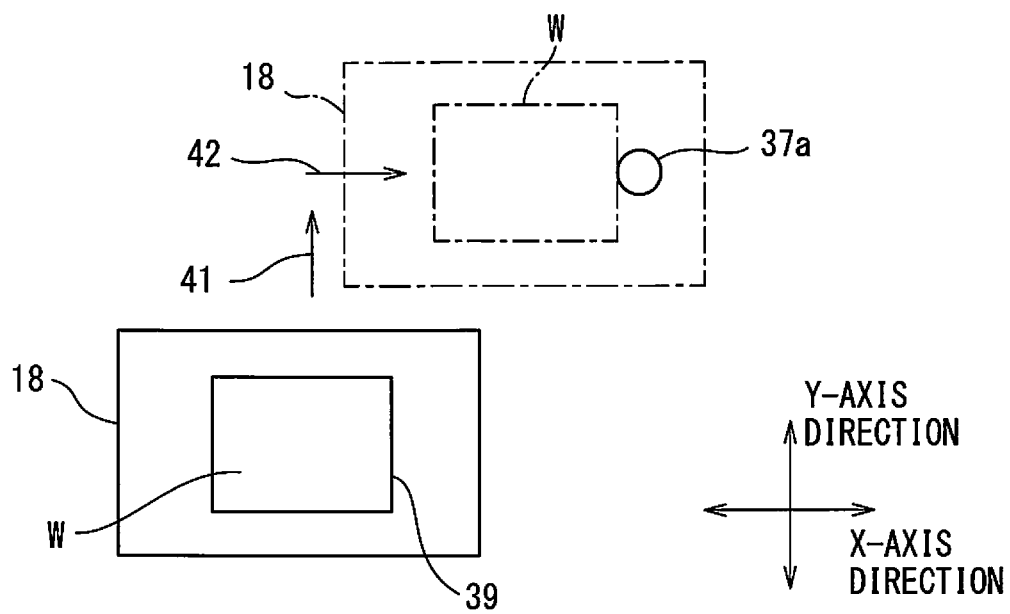
FIG. 2A is a top view of the machine tool schematically illustrating an example motion path of a touch probe, the path being generated by a touch probe motion path generating unit.
Figure 2B:
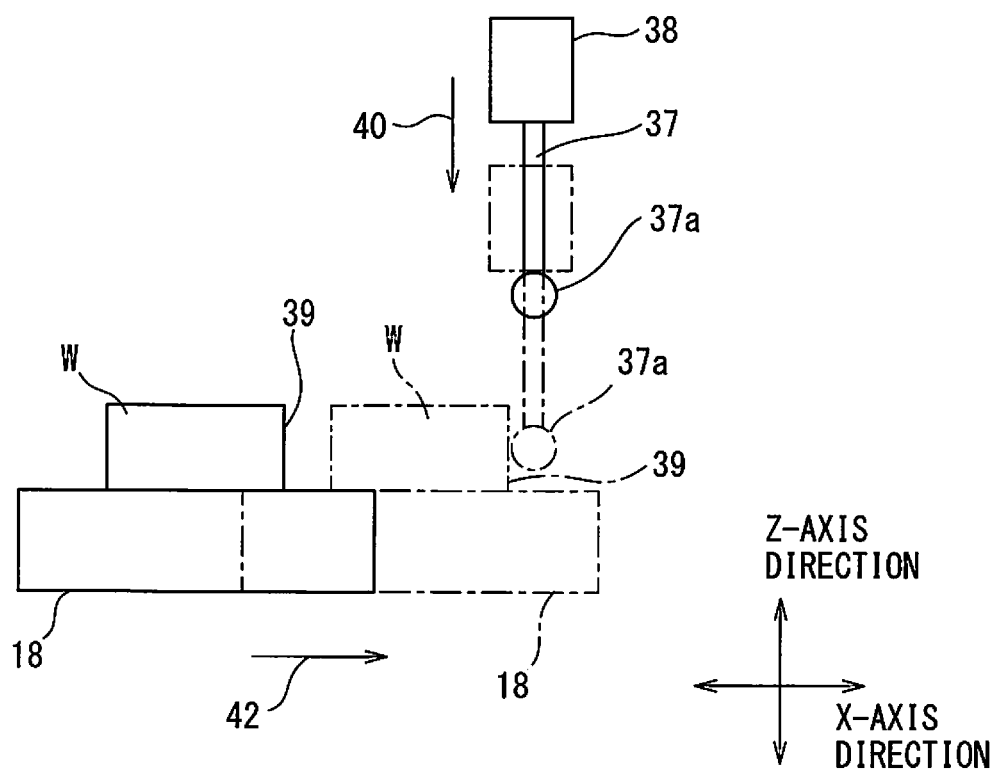
FIG. 2B is a front view of the machine tool schematically illustrating an example motion path of a touch probe, the path being generated by the touch probe motion path generating unit.

An example of the touch probe motion path generated by the above-described touch probe motion path generating unit 34 is illustrated in FIGS. 2A and 2B. FIGS. 2A and 2B are a top view and a front view, respectively, of the machine tool 11 schematically illustrating a motion path of the touch probe. As illustrated in theses drawings, it is assumed that the touch probe 37 is attached to the main spindle 38 of a vertical machining center, and that the main spindle 38 is initially positioned at the machine origin of the vertical machining center. A generated motion path of the touch probe, for example, a motion path in which the stylus 37a on the touch probe 37 is brought into contact with an end face 39 of the workpiece W, may represent that, first, the main spindle 38 moves downward as indicated by the arrow 40 in FIG. 2B, up to a height where the stylus 37a on the touch probe 37 can contact the end face 39 of the workpiece W, for example, up to a height where the stylus 37a is positioned away from one edge of the top face of the workpiece by 10 mm in the −Z-axis direction. Subsequently, as indicated by the arrows 41 and 42 in FIG. 2A, the machining table 18 moves in the Y-axis direction and then in the X-axis direction, with the result that an end face 39 of the workpiece W comes into contact with the stylus 37A on the touch probe 37. It should be noted that this motion path of the touch probe is an example only, and the present invention is not limited to such path.

The workpiece origin updating unit 35 obtains positional coordinates of each end face or a top face of the workpiece W in the machine coordinate system, through the contact motion of the touch probe described above. Specifically, the touch probe starts the contact motion from the machine origin, and outputs a contact signal when the touch probe and the workpiece W come into contact with each other. Upon receipt of the contact signal, the workpiece origin updating unit 35 obtains the amount of movement of the machining table or the main spindle from the machine origin. Accordingly, a position away from the machine origin by such amount of movement represents the positional coordinates of an end face or a top face of the workpiece W in the machine coordinate system. In addition, when the center of the top face of the workpiece W is to be used as the workpiece origin, the workpiece origin updating unit 35 calculates three-dimensional coordinates of the center of the top face of the workpiece W from positional coordinates of each end face and a top face of the workpiece W. For example, X and Y coordinates of the center of the top face of a workpiece W can be obtained by calculating, from positional coordinates in the X-axis and Y-axis directions of each end face of the workpiece W, a midpoint in each direction. In this case, when the workpiece W has variations in size, the coordinates can be obtained by calculating a midpoint after performing the contact motion of the touch probe in both of the positive and negative directions with regard to the respective X-axis and Y-axis directions. The positional coordinate of a top face of the workpiece W represents the Z coordinate of the center of the top face of the workpiece W. The terms "X-axis direction", "Y-axis direction", and "Z-axis direction" as used herein mean the horizontal direction, the front-to-back direction, and the vertical direction, respectively, of a vertical machining center.

The workpiece origin updating unit 35 then updates any workpiece origin already set into the machining program 30 to the three-dimensional coordinates of the center of the top face of the workpiece W that have been calculated as described above. In this way, the coordinates of the workpiece origin that were obtained through computation and coordinate conversions based on image information on the workpiece W are updated to the coordinates of the workpiece origin that have been calculated directly from positional coordinates of each end face and a top face of the workpiece in the machine coordinate system, which improves positional accuracy of the workpiece origin.

An example method for updating the workpiece origin that has been obtained through the three-dimensional coordinate computing unit 32 and the coordinate converting unit 33 will now be described more specifically.

For example, when the workpiece W is a substantially cuboid-shaped ingot, the three-dimensional coordinate computing unit 32 calculates, based on image data of the workpiece W taken by the imaging apparatus 15, three-dimensional coordinates corresponding to individual edges, corners, and the like of a circumscribed rectangle that contains a three-dimensional point set that can be recognized as a top face of the ingot. Then, the coordinate converting unit 33 converts three-dimensional coordinates of such rectangle into three-dimensional coordinates in the machine coordinate system for the machine tool 11.

The touch probe motion path generating unit 34 generates a motion path of the touch probe so that a stylus on the touch probe is positioned in the −Z-axis direction, e.g., 10 mm apart, from the center of each edge of the above-mentioned rectangle. It is assumed here that the touch probe has been attached to the main spindle of the machine tool 11 by the machine operator in advance and that dimensions of the touch probe have already been input into the touch probe motion path generating unit 34. Then, according to the generated motion path of the touch probe, the machine tool control unit 12 moves the main spindle and the machining table 18 of the machine tool 11 to cause contact motion of the touch probe (see FIGS. 2A and 2B, for example). Then, upon receipt of a contact signal from the touch probe, the machine tool control unit 12 separates the touch probe and the workpiece W from each other by a predetermined distance, and then causes low-speed contact motion of the touch probe, the whole process of which is repeated a predetermined number of times. Every time a contact signal is received during these repeated operations, the workpiece origin updating unit 35 obtains positional coordinates of the workpiece's end face with which the touch probe has come into contact, and updates the coordinates accordingly. Consequently, the workpiece origin updating unit 35 can accurately obtain positional coordinates of an end face of the workpiece in the machine coordinate system. Preferably, the above-described repeated operations are also performed on a top face of the workpiece W. This additionally makes it possible to accurately obtain positional coordinates in the machine coordinate system of the top face of a workpiece.

Methods for updating coordinates of the workpiece origin to more accurate coordinates are not limited to the above-described repeated operations, and may include the method described below. First, the main spindle of the machine tool 11, e.g., the main spindle of a vertical machining center, is brought near to the workpiece W at a low speed while rotating at a predetermined rotational speed. During this operation, no machining tool is attached to the main spindle. To improve accuracy of, for example, the Z coordinate of the workpiece origin, the machine tool control unit 12 positions the tip of the main spindle at the coordinates of the workpiece origin that have been obtained through the three-dimensional coordinate computing unit 32 and the coordinate converting unit 33, and then moves the rotating main spindle in the −Z-axis direction at a low speed. Consequently, when the tip of the rotating main spindle contacts the workpiece W, a load is put on the main spindle, causing an increase in disturbance torque on the main spindle. The workpiece origin updating unit 35 obtains positional coordinates of the tip of the main spindle when disturbance torque is increased, and updates the Z coordinate of the workpiece origin accordingly. Obviously, updating coordinates of the workpiece origin by contacting the main spindle and the workpiece W each other in this way is also effective in improving accuracy of X and Y coordinates of the workpiece origin.

An increase in disturbance torque on the main spindle can be detected by monitoring any change in a value of the electric current for the servo motor that rotates the main spindle. In other words, disturbance torque on the main spindle can be managed through values of the electric current for the servo motor. The disturbance torque monitored as described above means a difference between the torque that is input to the servo motor in response to an operation command (i.e., the value of commanded electric current) and the torque that is actually consumed for operating the servo motor (i.e., the value of consumption electric current). For example, as long as a load on the servo motor falls within a predetermined range, the value of consumption electric current is equal to the value of commanded electric current, and thus no disturbance torque is generated. In contrast, when a load on the servo motor exceeds a predetermined range, feedback control is performed, leading to a higher value of consumption electric current, i.e., greater disturbance torque.

An example operation flow for the machine tool control system 1 to obtain a workpiece origin mentioned above will now be described with reference to FIGS. 1 to 3. FIG. 2 is a flow chart illustrating an example operation flow for the machine tool control system 1 to obtain a workpiece origin.

First, the robot control unit 16 activates the robot 14 to cause the robot hand (not illustrated) at the tip of the robot 14 to grip the workpiece W located outside the casing 19 and place it on the seat 21 in the casing 19 (Step S11 in FIG. 3). During this step, the door 20 on the casing 19 is open. Then, the machine tool control unit 12 activates the clamp mechanism on the fixture 22 to clamp the workpiece W placed on the seat 21 (Step S12 in FIG. 3).

Next, the robot control unit 16 causes the imaging apparatus 15 attached to the tip of the robot 14 to take an image of the workpiece W on the seat 21 (Step S13 in FIG. 3). The imaging apparatus 15, being located at a predetermined position relative to the operation origin of the robot 14, takes an image of the workpiece W from above the workpiece W. The imaging apparatus 15 may employ any three-dimensional measurement technique as long as three-dimensional images of the workpiece W can be obtained. As described above, the imaging apparatus 15 according to the present embodiment uses a two- or three-dimensional camera. When a two-dimensional camera is used as the imaging apparatus 15, the robot control unit 16 moves the imaging apparatus 15 attached to the tip of the robot 14 to two predetermined positions above the seat 21 in succession to take images of the workpiece W at the respective positions. When a three-dimensional camera is used as the imaging apparatus 15, the robot control unit 16 places the imaging apparatus 15 attached to the tip of the robot 14 at one predetermined position above the seat 21 to take images of the workpiece W at the position.

Subsequently, it is ascertained whether the workpiece W is properly seated on the seat 21, based on the image data of the workpiece W taken by the imaging apparatus 15 (Step S14 in FIG. 3). A three-dimensional image of the workpiece W that is properly placed on the seat 21 has been stored and retained in advance in the image data retaining unit 31. Thus, the three-dimensional coordinate computing unit 32 determines whether the workpiece is properly seated, by comparing the image data of the workpiece that has just been taken with the image data that represents the properly seated workpiece. In case of an error, the three-dimensional coordinate computing unit 32 generates an alarm by, for example, emitting a sound, light, or the like, notifying that the workpiece W is erroneously placed (Step S22 in FIG. 3). When there is no error, the workpiece is subjected to the next process.

When the workpiece is found to be properly seated, the three-dimensional coordinate computing unit 32 calculates three-dimensional coordinates of the workpiece W in the robot coordinate system, in particular, three-dimensional coordinates of a surface of the workpiece W, based on the image data of the workpiece W taken by the imaging apparatus 15. In addition, the three-dimensional coordinate computing unit 32 obtains coordinates of a specified machining start point on the workpiece W, for example, coordinates of the center of the top face of the workpiece W, from the calculated three-dimensional coordinates (Step S15 in FIG. 3). Then, the coordinate converting unit 33 in the machining program generating unit 13 converts the coordinates of the machining start point on the workpiece W calculated as coordinates in the robot coordinate system into coordinates in the machine coordinate system for the machine tool 11 (Step S16 in FIG. 3).

Next, the machining program generating unit 13 determines whether the machine operator has sent a request for improving accuracy of the workpiece origin by using a touch probe (Step S17 in FIG. 3). This determination is implemented based on, for example, the machine operator inputting a command to improve accuracy of the workpiece origin to the machining program generating unit 13 through the control operation panel (not illustrated) on the machine tool 11.

When it is determined in Step S17 above that there is no request for improving accuracy of the workpiece origin, the coordinate converting unit 33 reflects the coordinates of the machining start point, which are the coordinates produced through the coordinate conversion in Step S16, in a workpiece origin setting command contained in the machining program 30 (Step S20 in FIG. 3). In other words, such coordinates of the machining start point are written to the G-Code command for setting a workpiece coordinate system (G54) in the machining program 30 or replace any workpiece origin that is already written.

On the other hand, when it is determined that there is a request for improving accuracy of the workpiece origin in Step S17 above, the touch probe motion path generating unit 34 generates a motion path of the touch probe as described above (Step S18 in FIG. 3).

Then, based on the generated motion path of the touch probe, the machine tool control unit 12 moves the main spindle and the machining table 18 of the machine tool 11 to cause the contact motion of the touch probe. Consequently, the workpiece origin updating unit 35 obtains positional coordinates of each end face and a top face of the workpiece W in the machine coordinate system. In addition, the workpiece origin updating unit 35 calculates three-dimensional coordinates of the center of the top face of the workpiece W, as the machining start point, from positional coordinates of each end face and a top face of the workpiece W. In other words, three-dimensional coordinates in the machine coordinate system of the machining start point on the workpiece W are obtained again, through contact motion of the touch probe (Step S19 in FIG. 3).

The workpiece origin updating unit 35 further reflects the obtained three-dimensional coordinates of the machining start point on the workpiece W in a workpiece origin setting command contained in the machining program 30 (Step S20 in FIG. 3). In other words, the workpiece origin updating unit 35 updates the workpiece origin already written to the machining program 30 to the calculated three-dimensional coordinates of the center of the top face of the workpiece W. Accordingly, the machining program generating unit 13 generates a machining program 30 again, based on the updated workpiece origin. Then, the machine tool control unit 12 starts machining the workpiece W in accordance with the machining program 30 that identifies the workpiece origin obtained through the above-described operation flow (Step S21 in FIG. 3).

As seen in the above descriptions, according to the workpiece origin setting method of present embodiment, first, the imaging apparatus 15 is attached to the tip of the robot 14 that is placed alongside the machine tool 11, and then three-dimensional coordinates of the workpiece W fixed on the seat 21 in the machine tool 11, in particular, three-dimensional coordinates of a specified machining start point on the workpiece W, are calculated by using a three-dimensional measurement technique. Next, the calculated three-dimensional coordinates of the machining start point are converted into coordinates in the machine coordinate system for the machine tool 11. Finally, the converted coordinates of the machining start point are set, as a workpiece origin, into the machining program 30 in the machine tool control unit 12. As a result, the method using the touch probe can greatly save the machine operator's labor for obtaining coordinates of a specified machining start point on the workpiece W and setting the coordinates into the machining program 30 that is stored and retained in the machine tool control unit 12.

Obviously, the workpiece setting method of the present invention can be applied to various conventional techniques to obtain workpiece origins with an apparatus other than touch probes (e.g., a laser measuring machine) to save labor for setting workpiece origins.

Other Embodiments

Other embodiments will now be described.

The machine tool control system of the embodiment illustrated in FIG. 1 has the imaging apparatus 15 that is attached to the tip of the robot 14. According to the present invention, however, three-dimensional coordinates of the workpiece W can be obtained in any configuration as long as the workpiece W fixed on the seat 21 can be imaged from a plurality of different directions. In other words, the present invention does not limit positions of the imaging apparatus 15 to the tip of the robot 14.

Figure 4:
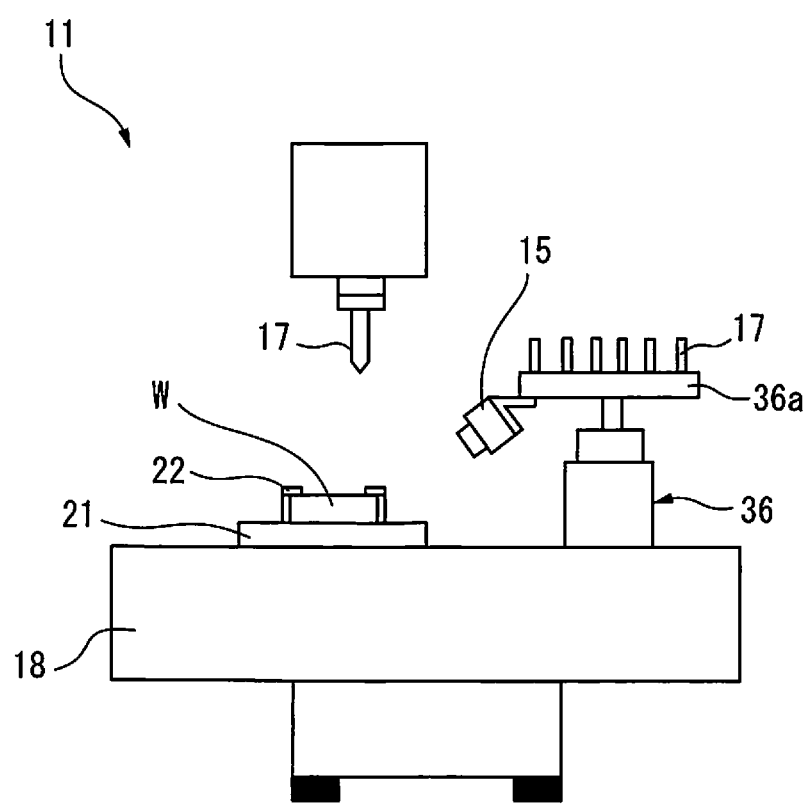
FIG. 4 indicates a place where an imaging apparatus is attached in a machine tool control system according to another embodiment.

FIG. 4 indicates a place where the imaging apparatus 15 is attached in the machine tool control system 1 according to another embodiment of the present invention. As illustrated in FIG. 4, when the machine tool 11 is a machining center with a turret-type automatic tool changer 36, the imaging apparatus 15 may be attached to a turret 36a on the automatic tool changer 36. The turret 36a holds plural types of machining tools 17 sequentially arranged in the circumference of the turret 36a, and rotates to a predetermined position when machining tools 17 are exchanged. In other words, positional accuracy on the turret 36a is assured by the rotational motion of the turret 36a. Thus, images of the workpiece W can be taken from two different directions by attaching a two-dimensional camera, as the imaging apparatus 15, on the turret 36a and rotating the turret 36a to move the two-dimensional camera to two positions in sequence.

In the machine tool control system 1 where the imaging apparatus 15 is attached to the turret 36a, it is also assumed that the relative positions of the imaging apparatus 15 and the turret 36a in the machine tool 11 to each other are predetermined through calibration. Determining the height of a surface of the workpiece W based on two pieces of image data taken by the imaging apparatus 15 whose camera position has been moved by the turret 36a in sequence makes it possible to obtain three-dimensional coordinates of the surface of the workpiece W. Obviously, three-dimensional coordinates of the workpiece W can also be obtained in a configuration where a three-dimensional camera, instead of a two-dimensional camera, is attached to the turret 36a.

Attaching the imaging apparatus 15 to the turret 36a as described above achieves the workpiece origin setting according to the present invention, without the need for the machine tool control system 1 involving the robot 14 disposed alongside the machine tool 11, as illustrated in FIG. 1.

In each of the embodiments described above, the machining program generating unit 13 in the machine tool control system 1 is disposed as a component separate from the machine tool control unit 12 and the robot control unit 16, as illustrated in FIG. 1, with the assumption that the machining program generating unit 13 can communicate with the machine tool control unit 12 and with the robot control unit 16 via communication cables (not illustrated) or communication radio waves. However, the machining program generating unit 13 may be built into either the machine tool control unit 12 or the robot control unit 16. In other words, the present invention needs a computing apparatus which calculates three-dimensional coordinates of the object imaged, based on a plurality of pieces of image data of the object, and thus such computing apparatus may be contained in the machine tool control unit 12 or in the robot control unit 16.

The above descriptions use a machining center as an example of the machine tool in the machining system of the present invention; however, the present invention can be applied to machine tools including not only machining centers but also NC milling machines, for example. In short, the present invention can be applied to general NC machine tools that need setting a workpiece origin into a machining program.

Typical embodiments have been described above; however, the present invention is not limited to the above embodiments, which can be modified in terms of various shapes, configurations, and materials without departing from the concept of the present invention.

Effects of Individual Aspects of the Invention

According to a first aspect and a sixth aspect of the present invention, an imaging apparatus is placed on a machine tool at a predetermined position and takes images of a workpiece fixed on the machine tool from a plurality of different directions, and then a three-dimensional coordinate computing unit calculates three-dimensional coordinates of the workpiece, in particular, three-dimensional coordinates of a specified machining start point on the workpiece, based on a plurality of images of the workpiece. Subsequently, a coordinate converting unit converts the calculated three-dimensional coordinates of the machining start point into coordinates in the machine coordinate system for the machine tool, and then sets the converted coordinates of the machining start point, as a workpiece origin, into a machining program for the machine tool. Consequently, the machine operator's labor for obtaining the workpiece origin can be saved. In other words, the present invention can save the human labor for obtaining coordinates of a specified machining start point on the workpiece using, for example, a touch probe, and setting the coordinates into a machining program stored and retained in a machine tool control unit.

According to a second aspect of the present invention, the imaging apparatus is attached to the tip of a robot so as to be placed at a predetermined position in the machine tool by the robot. Accordingly, even when a two-dimensional camera is used as the imaging apparatus, it is still possible to obtain a plurality of pieces of workpiece image information that are taken from a plurality of different directions and are needed for calculating three-dimensional coordinates of the workpiece.

According to a third aspect of the present invention, the imaging apparatus is attached to a turret on a turret-type automatic tool changer in the machine tool so as to be placed at a predetermined position in the machine tool by the turret. Accordingly, even when a two-dimensional camera is used as the imaging apparatus, it is still possible to obtain a plurality of pieces of workpiece image information that are taken from a plurality of different directions and are needed for calculating three-dimensional coordinates of the workpiece.

According to a fourth aspect and a seventh aspect of the present invention, a touch probe motion path generating unit generates a motion path of a touch probe to be brought into contact with each end face and a top face of the workpiece, based on three-dimensional coordinates of the workpiece obtained by the coordinate converting unit, so that the machine tool performs contact motion of the touch probe according to the motion path. With such touch probe motion path unit, the present invention can save the machine operator's labor for operations such as obtaining coordinates of a specified machining start point on the workpiece using a touch probe.

According to a fifth aspect and an eighth aspect of the present invention, in response to contact motion of the touch probe, the workpiece origin updating unit obtains positional coordinates of each end face and a top face of the workpiece in the machine coordinate system, calculates three-dimensional coordinates of a specified machining start point on the workpiece from the obtained positional coordinates, and re-sets the three-dimensional coordinates as the workpiece origin into the machining program for the machine tool.

With such workpiece origin updating unit, the present invention achieves updating of coordinates of the workpiece origin obtained based on workpiece image information to more accurate coordinates. In other words, the coordinates of the workpiece origin that were obtained through computation and coordinate conversion based on workpiece image information are updated to the coordinates of the workpiece origin that have been calculated directly from positional coordinates of each end face and a top face of the workpiece in the machine coordinate system, which improves positional accuracy of the workpiece origin.

According to a ninth aspect of the present invention, the rotating main spindle is brought into contact with the workpiece, the position of the main spindle is obtained when there is an increase in disturbance torque on the main spindle, and the obtained positional coordinates are re-set as the workpiece origin into the machining program for the machine tool. This achieves updating of coordinates of the workpiece origin obtained based on workpiece image information to more accurate coordinates, similarly to the above-described method for updating coordinates of a workpiece origin using a touch probe.

The invention claimed is:

1. A machine tool control system, comprising:
    a machine tool configured to machine an ingot according to a machining program;
    an imaging apparatus placed at a predetermined position in the machine tool and configured to take an image of the ingot by a stereo system;
    a three-dimensional coordinate computing unit configured to
        calculate three-dimensional coordinates of the ingot based on the image of the ingot taken by the imaging apparatus, and
        calculate, from the three-dimensional coordinates of the ingot, three-dimensional coordinates of a specified machining start point on the ingot;
    a coordinate converting unit configured to
        convert the three-dimensional coordinates of the machining start point on the ingot, that are calculated by the three-dimensional coordinate computing unit, into coordinates in a machine coordinate system for the machine tool, and
        set the converted three-dimensional coordinates of the machining start point on the ingot, as a workpiece origin, into the machining program for the machine tool;
    a touch probe configured to contact each of end faces and a top face of the ingot; and
    a workpiece origin updating unit configured to
        obtain, in response to the touch probe contacting the ingot, positional coordinates of each of the end faces and the top face of the ingot in the machine coordinate system,
        calculate further three-dimensional coordinates of the machining start point on the ingot from the obtained positional coordinates, and
        set the further three-dimensional coordinates of the machining start point, as the workpiece origin, into the machining program for the machine tool.

2. The machine tool control system according to claim 1, further comprising:
    a robot having a predetermined relative position to the machine tool, wherein
    the imaging apparatus along with a hand configured to grip the ingot is attached to a tip of the robot, and
    the robot is configured to place the imaging apparatus at the predetermined position in the machine tool.

3. The machine tool control system according to claim 1, wherein:
    the machine tool comprises an automatic tool changer to which a plurality of machining tools is configured to be attached,
    the imaging apparatus is attached to a turret of the automatic tool changer, and
    the turret is configured to place the imaging apparatus to the predetermined position in the machine tool.

4. The machine tool control system according to claim 1, further comprising:
    a touch probe motion path generating unit configured to generate a motion path of the touch probe to be brought into contact with each of the end faces and the top face of the ingot, based on the converted three-dimensional coordinates of the ingot obtained by the coordinate converting unit converting the three-dimensional coordinates of the ingot; and
    a machine tool control unit configured to cause the machine tool to perform contact motion of the touch probe according to the motion path of the touch probe, the motion path being generated by the touch probe motion path generating unit.

5. A workpiece origin setting method of setting a workpiece origin in a machine tool which machines an ingot according to a machining program, the method comprising:
  placing an imaging apparatus at a predetermined position in the machine tool and taking an image of the ingot by a stereo system;
  calculating three-dimensional coordinates of the ingot based on the image of the ingot taken by the imaging apparatus, and calculating, from the three-dimensional coordinates of the ingot, three-dimensional coordinates of a specified machining start point on the ingot;
  converting the three-dimensional coordinates of the machining start point on the ingot into coordinates in a machine coordinate system for the machine tool;
  setting the converted three-dimensional coordinates of the machining start point on the ingot, as a workpiece origin, into the machining program for the machine tool;
  converting the three-dimensional coordinates of the ingot into the coordinates in the machine coordinate system for the machine tool;
  after setting the workpiece origin, generating a motion path of a touch probe to be brought into contact with each of end faces and a top face of the ingot, based on the converted three-dimensional coordinates in the machine coordinate system for the machine tool;
  causing the machine tool to perform contact motion of the touch probe, according to the generated motion path of the touch probe;
  obtaining positional coordinates of each of the end faces and the top face of the ingot in the machine coordinate system, in response to the contact motion of the touch probe;
  calculating, from the obtained positional coordinates, further three-dimensional coordinates of the machining start point on the ingot; and
  setting the further three-dimensional coordinates of the machining start point, as the workpiece origin, into the machining program for the machine tool.

6. A workpiece origin setting method of setting a workpiece origin in a machine tool which machines a workpiece according to a machining program, the method comprising:
  placing an imaging apparatus at a predetermined position in the machine tool and taking an image of the workpiece from a plurality of different directions;
  calculating three-dimensional coordinates of the workpiece based on a plurality of taken images of the workpiece, and calculating, from the three-dimensional coordinates, three-dimensional coordinates of a specified machining start point on the workpiece;
  converting the three-dimensional coordinates of the calculated machining start point on the workpiece into coordinates in a machine coordinate system for the machine tool;
  setting the converted three-dimensional coordinates of the machining start point on the workpiece, as a workpiece origin, into the machining program for the machine tool;
  converting the three-dimensional coordinates of the workpiece into the coordinates in the machine coordinate system for the machine tool;
  rotating, at a predetermined rotation speed, a main spindle to which a machining tool for the machine tool is to be attached;
  after setting the workpiece origin, moving the rotating main spindle to each of end faces and a top face of the workpiece, based on the converted three-dimensional coordinates of the workpiece in the machine coordinate system for the machine tool; and
  in response to detection of an increase in disturbance torque on the rotating main spindle, the increase being caused by contact of the rotating main spindle with the workpiece,
    obtaining positional coordinates of each of the end faces and the top face of the workpiece in the machine coordinate system,
    calculating, from the obtained positional coordinates, further three-dimensional coordinates of the machining start point on the workpiece, and
    setting the further three-dimensional coordinates of the machining start point, as the workpiece origin, into the machining program for the machine tool.

7. The machine tool control system according to claim 1, wherein the three-dimensional coordinate computing unit is configured to obtain the three-dimensional coordinates of the machining start point on the ingot based on image data of the ingot from the imaging apparatus.

\* \* \* \* \*